US006956629B2

United States Patent
Tsubakimoto et al.

(10) Patent No.: US 6,956,629 B2
(45) Date of Patent: Oct. 18, 2005

(54) DISPLAY DEVICE OF REDUCED SIZE INCLUDING A POINT LIGHT SOURCE PROVIDED AT AN END OF A DISPLAY AREA

(75) Inventors: Yasuhito Tsubakimoto, Shizuoka (JP); Hiroshi Goto, Shizuoka (JP); Yoshimi Kuramochi, Shizuoka (JP); Hidehiro Wakamiya, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 10/617,735

(22) Filed: Jul. 14, 2003

(65) Prior Publication Data

US 2004/0056988 A1 Mar. 25, 2004

(30) Foreign Application Priority Data

Jul. 12, 2002 (JP) ........................................ 2002-203730

(51) Int. Cl.⁷ .................... G02F 1/1335; G02F 1/1345; F21V 7/04
(52) U.S. Cl. ........................ 349/61; 349/65; 349/151; 362/31
(58) Field of Search ................................ 349/58, 60–65, 349/149–152; 362/31, 26

(56) References Cited

U.S. PATENT DOCUMENTS

| 5,694,190 | A | * | 12/1997 | Matsumoto et al. | ........ 349/151 |
| 5,854,667 | A | * | 12/1998 | Ackermann | ................. 349/187 |
| 6,147,739 | A | | 11/2000 | Shibatani | .................... 349/152 |
| 6,417,897 | B1 | * | 7/2002 | Hashimoto | .................... 349/65 |
| 6,529,179 | B1 | * | 3/2003 | Hashimoto et al. | ........... 345/87 |
| 6,669,350 | B2 | * | 12/2003 | Yamashita et al. | .......... 362/612 |
| 6,803,978 | B2 | * | 10/2004 | Bayrle et al. | ................. 349/73 |
| 2002/0167626 | A1 | * | 11/2002 | Matsuda et al. | ............... 349/65 |
| 2003/0164903 | A1 | * | 9/2003 | Saito et al. | .................... 349/58 |
| 2004/0114069 | A1 | * | 6/2004 | Lai | .............................. 349/65 |

FOREIGN PATENT DOCUMENTS

| CN | 1170187 A | | 1/1998 |
| JP | 2000-268621 | | 9/2000 |
| JP | 2001-147431 | | 5/2001 |
| JP | 2003100132 | * | 4/2003 |

* cited by examiner

*Primary Examiner*—Tarifur R. Chowdhury
(74) *Attorney, Agent, or Firm*—Fitzpatrick, Cella, Harper & Scinto

(57) ABSTRACT

A display device can be reduced in size while suppressing evenness in luminance. An image forming apparatus having such a display device incorporated therein is also provided. A driving unit drives a liquid crystal. A first member and a second member are disposed in opposition to each other with the liquid crystal interposed therebetween. The first member has a display area, and the second member has a display corresponding area corresponding to the display area of the first member and a non-display corresponding area which is different from the display corresponding area. A source of light is disposed within the non-display corresponding area of the second member. A guide member is disposed at a side of the second member opposite the first member for guiding light from the source of light.

12 Claims, 4 Drawing Sheets

DISPLAY DEVICE OF REDUCED SIZE INCLUDING A POINT LIGHT SOURCE PROVIDED AT AN END OF A DISPLAY AREA

This application claims the right of priority under 35 U.S.C. § 119 based on Japanese Patent Application No.JP2002-203730 which is hereby incorporated by reference herein in its entirety as if fully set forth herein.

BACKGROUND OF THE INVENTION

1. Field of the Invention

The present invention relates to a display device applied to an image forming apparatus such as a printer, and more particularly, to an arrangement of a source of light for illuminating a liquid-crystal display panel.

2. Description of the Related Art

FIG. 6 is a view explaining a known display device. This known display device includes a liquid-crystal display panel 11 of a rectangular shape, a point-like light source in the form of an LED 15 that is arranged adjacent to an illustrated left side portion of the liquid-crystal display panel 11, a display driver IC 12 that is arranged outside of an illustrated lower side portion of the liquid-crystal display panel 11, and a casing 13 that supports the entire display device.

FIG. 7 is a view showing the state in which the liquid-crystal display panel 11 of FIG. 6 has been removed for explanation of the parts arranged at a rear side of the liquid-crystal display panel 11. Reference numeral 14 designates a light guide plate for guiding the light of the LED 15.

FIG. 8 is a view explaining the distance relationship between a liquid crystal display area 16 of the liquid-crystal display panel 11 and the LED 15. The liquid crystal display area 16 is a smaller-size area within the liquid-crystal display panel 11. Reference character A represents the shortest distance from the LED 15 to the liquid crystal display area 16, and reference character B' represents the width of the entire apparatus in the illustrated right-and-left or horizontal direction (i.e., longitudinal direction of the liquid crystal display area) of that side of th casing 13 at which the LED 15 is arranged.

Now, reference will be made to a back light unit of the display device as constructed above. The light emitted from the LED 15 enters the light guide plate 14 from its light-receiving surface, and is guided to diffuse by the light guide plate 14. In this case, the diffusing light, which has gone through the light guide plate 14 to the side opposite the liquid-crystal display panel 11, is reflected by the casing 13 to pass through the light guide plate 14 and the liquid-crystal display panel 11. On the other hand, the diffusing light, which has passed to the side of the liquid crystal display panel 11, directly goes through the liquid-crystal display panel 11.

The closer to the liquid crystal display area 16 the LED 15 is disposed, the brighter it acts as a back light for the liquid-crystal display panel 11; however, if the LED 15 is disposed too close to the liquid-crystal display panel 11, the neighborhood of the LED 15, acting as a light source, becomes too bright, thus generating unevenness in luminance.

In view of such a circumstance, the LED 15 is disposed at a side of the liquid-crystal display panel 11 while ensuring the appropriate distance A therebetween so as to suppress the luminance unevenness within an allowable range. However, it is necessary to ensure such a distance A, thus resulting in the problem that reduction in the entire width B' of the apparatus is difficult.

SUMMARY OF THE INVENTION

Accordingly, an object of the present invention is to provide a display device, which can be reduced in size while suppressing unevenness in luminance, as well as an image forming apparatus having such a display device incorporated therein.

A more specific object of the present invention is to provide a display device which includes: a driving unit for driving a liquid crystal; a first member and a second member disposed in opposition to each other with the liquid crystal interposed therebetween, the first member having a display area, the second member having a display corresponding area corresponding to the display area of the first member and a non-display corresponding area which is different from the display corresponding area; a source of light disposed within the non-display corresponding area of the second member; and a guide member disposed at a side of the second member opposite the first member for guiding light from the source of light.

Another specific object of the present Invention is to provide an image forming apparatus incorporating therein a display device as constructed above.

The above and other objects, features and advantages of the present invention will become apparent from the following description of a preferred embodiment of the present invention taken in conjunction with the accompanying drawings.

DESCRIPTION OF THE PREFERRED EMBODIMENT

Hereinafter, a preferred embodiment of the present invention will be described in detail, by way of example, while referring to the accompanying drawings. However, it is to be understood that the measurements, materials, configurations, relative arrangements and the like of component parts described in the following embodiment are only illustrative and should not be construed as limiting the range of legal protection for the present invention in any manner, in particular unless specified otherwise.

Now, one preferred embodiment of the present invention will be described below while referring to FIGS. 1 through 5.

Figure 1:
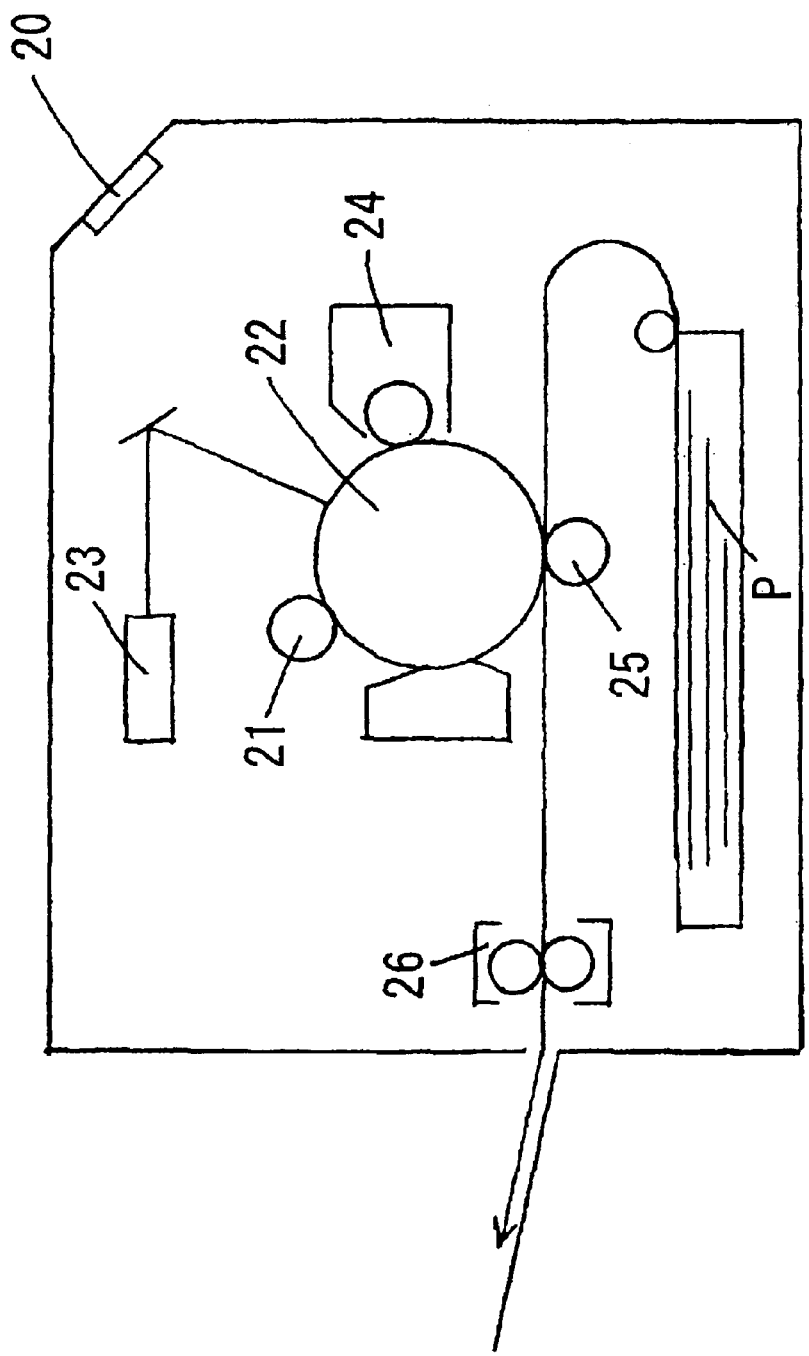
FIG. 1 is a view showing an image forming apparatus according to an embodiment of the present invention.

FIG. 1 is a view showing an image forming apparatus that is a preferred embodiment of the present invention. An image bearing member 22, being charged or electrified by a charging unit 21, is exposed by an exposure unit 23 to form an electrostatic latent image thereon. This electrostatic latent image is developed by a development unit 24 to form a toner image on the image bearing member 22. This toner image is transferred to a recording material P by means of a transfer unit 25, and the recording material P having the toner image thus transferred thereto is passed through a fixing unit 26, whereby the toner image is fixed onto the recording material P. Thereafter, the recording material P is discharged out from the apparatus. A display device 20 serves to display information (printing condition, jam of the recording material, etc.) related to the image forming unit inside the apparatus.

Figure 2:
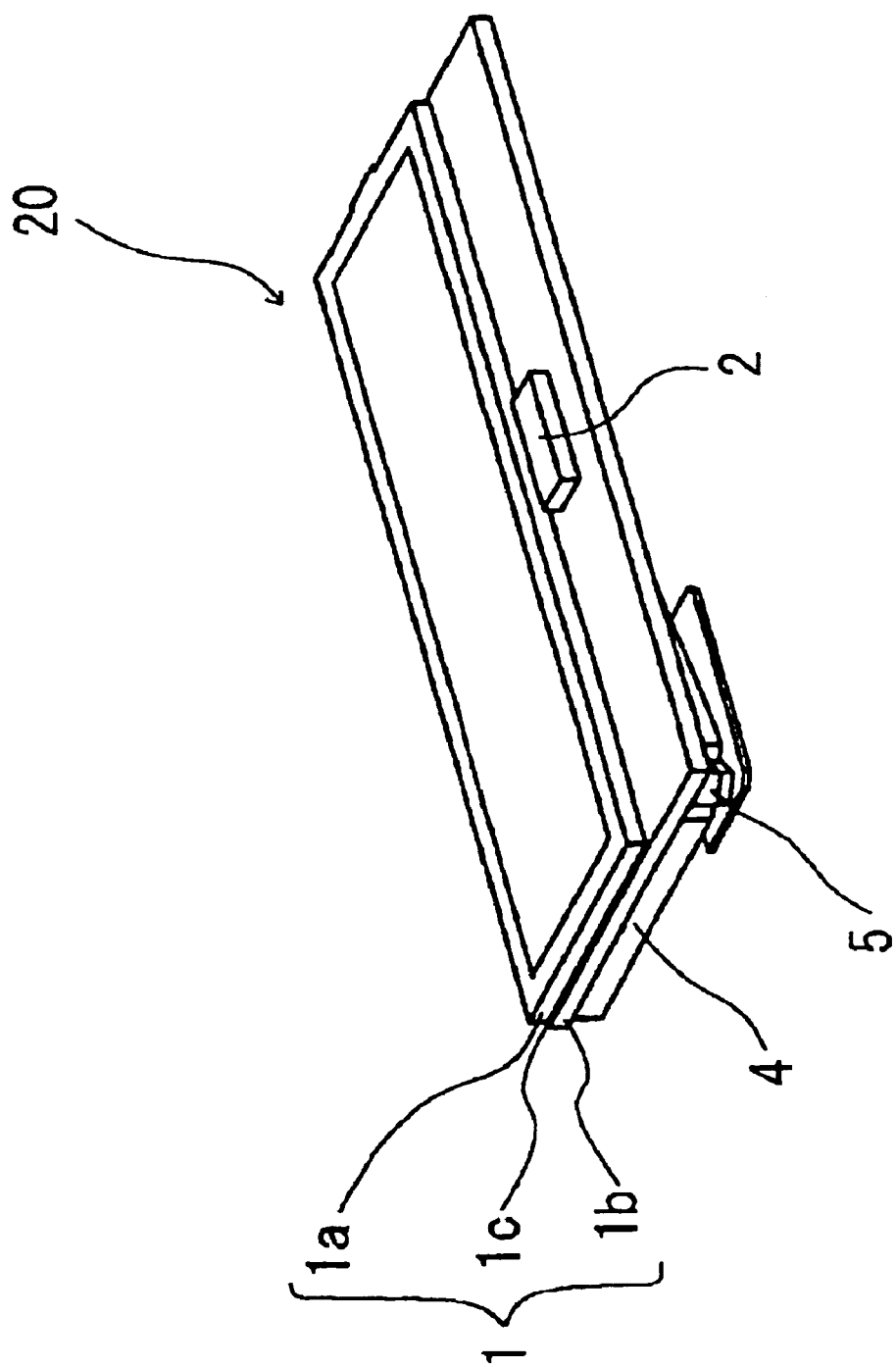
FIG. 2 is a perspective view of a display device for use in the image forming apparatus according to the embodiment of the present invention.

FIG. 2 is a perspective view of the display device that is a preferred embodiment of the present invention. In this figure, a casing 3 (to be described later) is omitted for convenience of explanation.

A liquid-crystal display panel 1 is comprised of a first member 1a, a second member 1b, a liquid crystal 1c, etc. The first member 1a and the second member 1b are optically transparent members made of glass or the like. The liquid crystal 1c is disposed between the first member 1a and the second member 1b. An IC chip 2 acts as a driving unit that drives the liquid crystal 1c. A circuit pattern for transmitting a signal from the IC chip 2 is formed on a surface of the second member 1b which lies at the side of the first member 1a. The second member 1b extends longer than the first member 1a in a direction orthogonal to the longitudinal direction of the first member 1a, with the IC chip 2 being arranged on the long extended portion of the second member 1b. An LED 5 is in the form of a point-like light source, and a guide member in the form of a light guide plate 4 serves to guide the light emitted from the LED 5.

Figure 3:
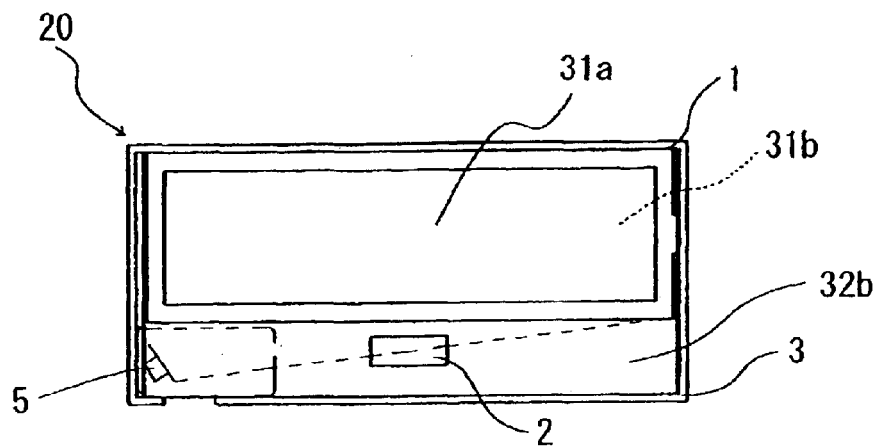
FIG. 3 is a plan view of the display device.

FIG. 3 is a plan view of the display device. As shown in this figure, the liquid-crystal display panel 1 is in the shape of a rectangle, and the first member 1a has a liquid crystal display area 31a. The second member 1b has a display corresponding area 31b corresponding to the liquid crystal display area 31a of the first member 1a and a support area 32b which is different from the display corresponding area 31b and which supports the IC chip 2. The support area 32b is a non-display corresponding area.

The display area 31a of the first member 1a is also in the shape of a rectangle. The display corresponding area 31b and the support area 32b of the second member 1b are disposed in a side-by-side relation with each other in a direction orthogonal to the longitudinal direction of the display area 31a of the first member 1a.

The IC chip 2 is arranged on the second member 1b outside of an illustrated lower side portion of the first member 1a. The casing 3 supports the entire display device, and is larger than the liquid-crystal display panel 1 with a space being formed at the side of the illustrated lower side portion of the first member 1a.

Figure 4:
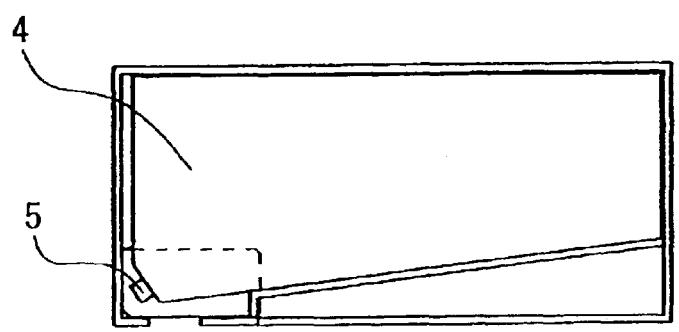
FIG. 4 is a view showing a source of light and a light guide plate of the display device.

FIG. 4 is a view showing the state in which the liquid-crystal display panel 1 of FIG. 3 has been removed in order to explain the parts arranged at a rear side of the liquid-crystal display panel 1 of FIG. 3. The light guide plate 4 protrudes from the display corresponding area 31b of the second member 1b in a direction toward the support area 32b, so that the LED 5 is arranged, similar to the IC chip 2, in the vicinity of a corner of the liquid-crystal display panel 1 at the outer side of the lower side portion of the first member 1a. In other words, the LED 5 is arranged within the support area 32b of the second member 1b, when viewed in a direction from the first member 1a to the second member 1b (i.e., in a direction perpendicular to the plane of FIG. 3 to FIG. 5).

Figure 5:
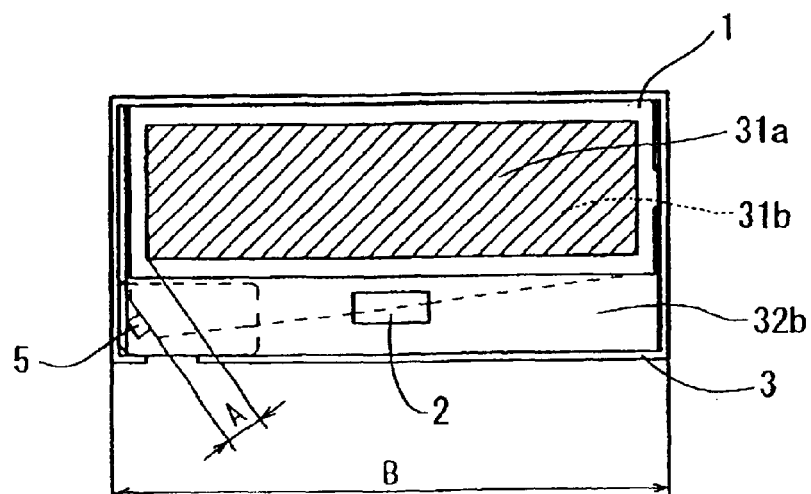
FIG. 5 is a view showing the distance relationship between a liquid crystal display area and the source of light.
Figure 6:
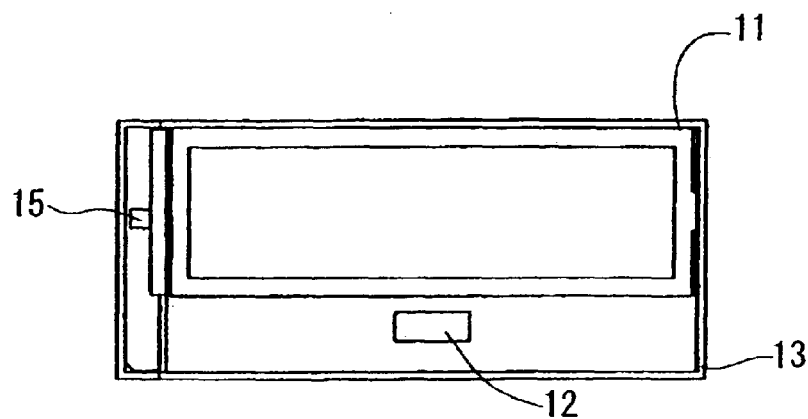
FIG. 6 is a plan view of a known display device.
Figure 7:
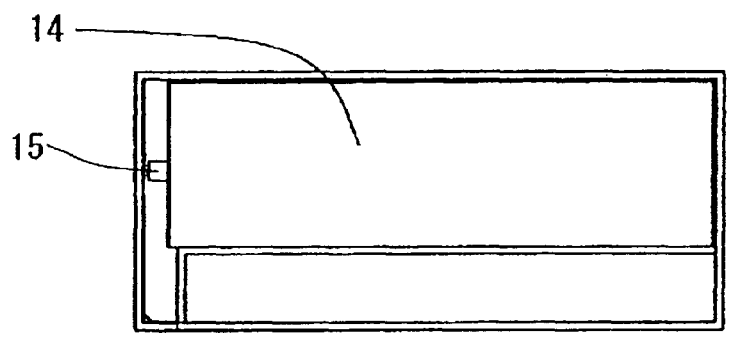
FIG. 7 is a view showing a source of light and a light guide plate of the known display device shown in FIG. 6.

FIG. 5 is a view explaining the distance relationship between the liquid crystal display area 31a of the first member 1a and the LED 5. The liquid crystal display area 31a is a smaller-size area within the first member 1a. In FIG. 5, reference character A represents the shortest distance from the LED 5 to the liquid crystal display area 31a, and reference character B represents the width of the entire apparatus in the illustrated right-and-left or horizontal (longitudinal) direction of the casing 3.

The display device as constructed above will be explained below. The light emitted from the LED 5 enters the light guide plate 4 from its light-receiving surface, and is guided to diffuse by the light guide plate 4. The diffusing light, which has gone through the light guide plate 4 to the side opposite the liquid-crystal display panel 1, is reflected by the casing 3 to pass through the light guide plate 4 and the liquid crystal display panel 1. On the other hand, the diffusing light, which has passed to the side of the liquid-crystal display panel 1, directly goes through the liquid-crystal display panel 1.

Figure 8:
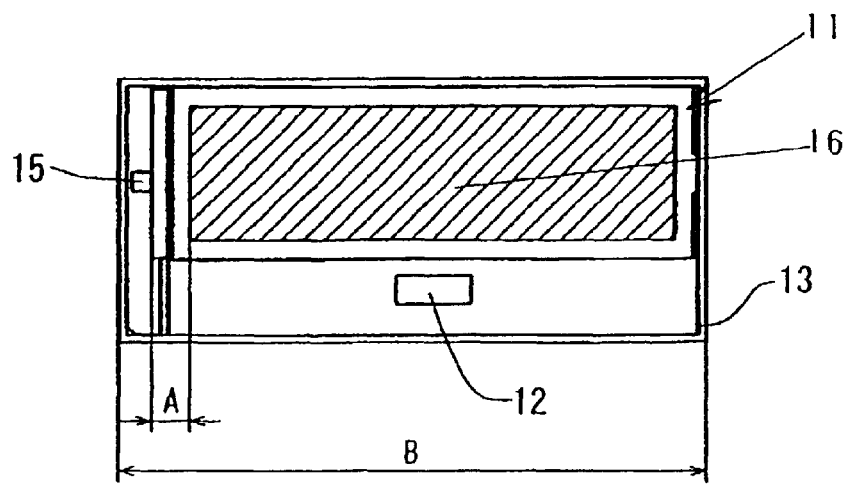
FIG. 8 is a view showing the distance relationship between a liquid crystal display area and the source of light shown in FIG. 6.

Here, note that in order for the light from the LED 5 to obliquely enter the rectangular-shaped liquid crystal display area 31a from a diagonal direction, the LED 5 is disposed in th vicinity of a corner of the liquid-crystal display panel 1 at the side of the IC chip 2 while ensuring the shortest distance A from the LED 5 to the liquid crystal display area 31a. With this arrangement, the width B of the entire apparatus can be suppressed to a minimum size, whereby the width B can be made smaller than the width B' in FIG. 8.

That is, the IC chip 2 can be arranged within the support area 32b of the second member 1b in a space in the vicinity of a corner of the liquid-crystal display panel 1 while ensuring the shortest distance A from the LED 5 to the liquid crystal display area 31a. Therefore, only the illustrated right-side and left-side portions of the casing 3 enclose the liquid-crystal display panel 1, thus making it possible to reduce the width B of the entire apparatus to a minimum.

In addition, since the entire LED 5 can be arranged within the support area 32b of the second member 1b, the width of the LED 5 can be shortened in its longitudinal width or direction.

Accordingly, it is possible to increase the distance from the LED 5 to the liquid crystal display area 31a of the liquid-crystal display panel 1 to the maximum within the projected area of the display device while suppressing the longitudinal width of the display device to a minimum. As a result, unevenness in luminance can be suppressed.

In this embodiment, the LED 5, acting as a source of light, is arranged only at a single location at the illustrated lower left side, but it is evident that the same advantageous effects can be obtained, for instance, even if the LED is arranged at the illustrated lower right side, or if two LEDs are arranged at the illustrated lower right and left sides, respectively.

As described in the foregoing, the present invention can reduce the size of the apparatus while suppressing unevenness in luminance.

Although the preferred embodiment of the present invention has been described, the present invention is not at all limited to the above-mentioned embodiment, but can be subjected to any modifications or changes within the technical concept of the present invention.

What is claimed is:

1. A display device comprising:

a driving device for driving a liquid crystal;

a first member and a second member disposed in opposition to each other with the liquid crystal interposed therebetween, wherein said first member has a rectangular display area, said second member has a display corresponding area corresponding to said rectangular display area and a non-display corresponding area which is different from said display corresponding area and in which said driving device is provided, and said display corresponding area and said non-display corresponding area are juxtaposed with respect to a direction orthogonal to a longitudinal direction of said display area;

a point-like light source provided within said non-display corresponding area; and a guide member for guiding light from said light source, wherein said light source is provided not beyond a width of said first member and at an end of said display area, with respect to the longitudinal direction of said display area.

2. The display device according to claim 1, wherein said guide member extends beyond said display corresponding area toward said non-display corresponding area.

3. The display device according to claim 1, wherein said first member and said second member are optically transparent.

4. The display device according to claim 1, wherein said driving device is provided at a side of said second member near said first member.

5. The display device according to claim 1, wherein said light source and said guide member are provided at a side of said second member opposite said first member.

6. The display device according to claim 1, wherein said driving device comprises an IC chip.

7. An image forming apparatus comprising:

an image forming device for forming an image on a recording material;

a display device for displaying information related to said image forming device, said display device comprising:

a driving device for driving a liquid crystal;

a first member and a second member disposed in opposition to each other with the liquid crystal interposed therebetween, wherein said first member has a rectangular display area, said second member has a display corresponding area corresponding to said rectangular display area and a non-display corresponding area which is different from said display corresponding area and in which said driving device is provided, and said display corresponding area and said non-display corresponding area are juxtaposed with respect to a direction orthogonal to a longitudinal direction of said display area;

a point-like light source provided within said non-display corresponding area; and a guide member for guiding light from said light source, wherein said light source is provided not beyond a width of said first member and at an end of said display area, with respect to the longitudinal direction of said display area.

8. The image forming apparatus according to claim 7, wherein said guide member extends beyond said display corresponding area toward said non-display corresponding area.

9. The image forming apparatus according to claim 7, wherein said first member and said second member are optically transparent.

10. The image forming apparatus according to claim 7, wherein said driving device is provided at a side of said second member near said first member.

11. The image forming apparatus according to claim 7, wherein said light source and said guide member are provided at a side of said second member opposite said first member.

12. The image forming apparatus according to claim 7, wherein said driving device comprises an IC chip.

* * * * *